United States Patent [19]
Vanderbilt et al.

[11] Patent Number: 5,793,965
[45] Date of Patent: Aug. 11, 1998

[54] METHOD AND APPARATUS FOR DETERMINING THE TYPE OF AN OBJECT IN A DISTRIBUTED OBJECT SYSTEM

[75] Inventors: Peter Vanderbilt, Mountain View; David M. Brownell, Palo Alto; Alain Demour, San Francisco; Dwight F. Hare, La Selva Beach; Michael L. Powell, Palo Alto, all of Calif.

[73] Assignee: Sun Microsystems, Inc., Palo Alto, Calif.

[21] Appl. No.: 408,633

[22] Filed: Mar. 22, 1995

[51] Int. Cl.$^6$ .................................................... G06F 13/00
[52] U.S. Cl. ............................ 395/200.33; 395/200.31
[58] Field of Search ....................... 395/200.03, 860, 395/650, 600, 700, 200.31, 200.32, 133, 200.33; 345/335

[56] References Cited

U.S. PATENT DOCUMENTS

| | | | |
|---|---|---|---|
| 5,187,790 | 2/1993 | East et al. | 395/725 |
| 5,307,490 | 4/1994 | Davidson et al. | 395/650 |
| 5,421,012 | 5/1995 | Khoyi et al. | 395/650 |
| 5,437,025 | 7/1995 | Bale et al. | 395/600 |
| 5,437,027 | 7/1995 | Bannon et al. | 395/600 |
| 5,481,721 | 1/1996 | Serlet et al. | 395/700 |
| 5,497,463 | 3/1996 | Stein et al. | 395/200.03 |
| 5,511,197 | 4/1996 | Hill et al. | 395/700 |
| 5,566,302 | 10/1996 | Khalidi et al. | 395/200.09 |

OTHER PUBLICATIONS

Bob Hathaway, "Comp. Object. FAQ", Geodesic Systems, Nov. 5, 1993, pp. 1–180.
Andrew Birrell, Greg Nelson, Susan Owicki, and Edward Wobber, "Network Objects," 27 Dec. 1993, 8283 Operating Systems Review (SIGOPS) No. 5, New York.
Amitabh Dave, Mohlalefi Sefika and Roy Campbell, "*Proxies, Application Interfaces and Distributed Systems*," Jan. 1, 1992, Proceedings 2nd International Workshop Object Orientation in Operating Systems, 0-8186-305-9, IEEE.
Anonymous, "*Distributed Object Activation and Communication Protocols*," Jul., 1994, IBM Technical Disclosure Bulletin, vol. 37, No. 7, New York.

*Primary Examiner*—Mehmet B. Geckil
*Attorney, Agent, or Firm*—Beyer & Weaver, LLP

[57] ABSTRACT

A method of checking the type of an object located on a remote computer in a distributed object environment computing system is disclosed. Initially, a type checking method to determine whether a remotely located object is of a specified type is invoked. In the invocation, a target interface identifier is included as an argument. A determination is then made as to whether the target interface identifier is equal to or a base for an apparent interface identifier held by a proxy object located on the first computer. If the target interface identifier is determined to be equal to or a base for the apparent interface identifier, an affirmative indication to that effect is returned to the client process. If not, then the target interface identifier is then compared to a real interface identifier. In many embodiments, a call to the server host will have to be made in order to determine the real interface identifier. In some embodiments, a local cache memory can also be provided to store the results of such inquiries. The target interface identifier is then compared to the real interface identifier and a determination is made as to whether the target interface identifier is equal to or a base for the real interface identifier. The result is then returned to the client process. A method of checking the type of an object and additionally returning an output proxy object is also disclosed. The output proxy object may be the original input proxy object that has been widened to the class associated with the target interface identifier, or may be a newly created proxy object that is of the same kind as the input proxy and of the same type as the target interface identifier.

34 Claims, 11 Drawing Sheets

METHOD AND APPARATUS FOR DETERMINING THE TYPE OF AN OBJECT IN A DISTRIBUTED OBJECT SYSTEM

BACKGROUND OF THE INVENTION

1. The Field of the Invention

The present invention relates generally to the fields of distributed computing systems, client-server computing and object-oriented programming. More specifically, the present invention relates to methods and apparatus for determining the type of an object in a distributed object system.

2. The Relevant Art

Object-oriented programming methodologies have received increasing attention over the past several years in response to the increasing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program. Also, the ability to handle data is breaking down because the volume of information is growing at a faster rate than our ability to process it. Computer hardware performance has increased dramatically over the past decade, yet software performance has not. Traditional software approaches to designing, developing and maintaining information processing systems continue to limit our ability to manage data.

Object-oriented programming strategies tend to avoid these problems because object methodologies focus on manipulating data rather than procedures; thus providing the programmer with a more intuitive approach to modeling real world problems. In addition, objects encapsulate related data and procedures so as to hide that information from the remainder of the program by allowing access to the data and procedures only through the object's interface. Hence, changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This modularity increases software reliability while decreasing development time, as reliable programming code may be used repeatedly. For further description of object-oriented design and programming techniques see *Object-Oriented Technology* by David A. Taylor, Addison-Wesley 1990, *Object-Oriented Modeling and Design* from General Electric Research and Development Center, Prentice-Hall 1991, and *Object-oriented Software Construction* by Bertrand Meyer, Prentice-Hall 1988, for example. These three books are incorporated herein by reference.

However, the full promise of object-oriented methodologies, especially the advantages afforded by their modularity, has yet to be achieved. In particular, it would be highly desirable to allow programmers and other users access to objects in a transparent fashion so that objects created in different programming languages and objects residing on different computing platforms that are networked together are accessible to the user without extensive modification of the user's programming code.

The situation in which objects are located on different computers linked by a network is typically called client-server computing. In client-server computing, typically there is a set of computers that can communicate with one another through a network connecting the computers. Some of these computers act as providers of services or functionality to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

Attempts to provide such a distributed system have been made using object-oriented methodologies that are based upon a client-server model, in which server objects provide interfaces to client objects that make requests of the server objects. Typically in such a distributed system, these servers are objects consisting of data and associated methods. The client objects obtain access to the functionalities of the server objects by executing calls on them, which calls are mediated by the distributed system. When the server object receives the call it executes the appropriate method and transmits the result back to the client object. The client object and server object communicate through an Object Request Broker (ORB) which is used to locate the various distributed objects and to establish communications between objects.

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge, with the confidence that the remote object will be called, a method will execute, and data will be returned properly. Such a system maximizes the inherent advantages of object-oriented methodologies by taking full advantage of their modularity and encapsulation.

Another advantage of a distributed object system is that distributed objects are location-independent. That is, distributed objects may exist anywhere in a network: in the client's address space; in multiple address spaces on the client's machine; and in multiple machines across the network. All objects are treated uniformly by clients, no matter what their location. Further, distributed object systems provide greater functionality than conventional systems since application developers can rely on existing inventories of objects to provide base level functionality. They also include improved portability since applications can cooperate through user-defined platform-independent interfaces and also facilitate reduced development cost. Many other benefits can be realized with a distributed object system as well.

The software industry has responded to this need for a distributed object technology by forming the Object Management Group (OMG). The goal of the OMG is the definition of the Object Management Architecture (OMA), which has four major components: the Object Request Broker (ORB), Object Services, Common Facilities, and Application Objects. The Object Request Broker provides basic object communications and management services, thus forming the basis of a distributed object system. A standard for an Object Request Broker is contained in the Common Object Request Broker Architecture (CORBA) specification.

One implementation of the OMG specification of a distributed object system is called Distributed Objects Environment (DOE). In this implementation, the functionality of the ORB is performed by the Distributed Object Management Facility (DOMF). In other words, the DOMF provides the basic object services for the distributed object system. A description of the fundamental elements and functionality of DOE is contained in the *Interface User's Guide and Reference: Project DOE External Developer's Release 2*, May 1994, by SunSoft of Mountain View, Calif., and is herein incorporated by reference. (SunSoft is a trademark of Sun Microsystems, Inc.)

In the distributed object system, all objects have types. These types are known to the client. But in some cases, a client may only know of the general type of an object, yet wish to treat the object as a more specific type. This process of converting an object from a general to a specific type is called "narrowing". For example, if a client knows that an object is in general a printer, it might prove useful to be able to perform more specific operations for a color PostScript printer. That is, the client wishes to be able to narrow down the exact type of the printer. A client would wish to query the printer object, "are you really a color PostScript printer?" And in some cases, the client may wish to perform the reverse process and widen the type of an object. Considering a client's need to narrow or to widen the type of an object, it would be desirable to have a method and apparatus in a distributed object system to query an object about what type it is.

SUMMARY OF THE INVENTION

To achieve the foregoing and other objects and in accordance with the purpose of one aspect of the present invention, a method and apparatus of checking the type of an object located on a remote computer in a distributed object environment computing system is disclosed. In the type checking method, an inquiry is made as to whether the remotely located object is of a specified type. The specified type is typically referred to by an apparent interface identifier. Initially, a type checking method to determine whether a remotely located object is of a specified type is invoked. In the invocation, a target interface identifier is included as an argument. A determination is then made as to whether the target interface identifier is equal to or a base for an apparent interface identifier held by a proxy located on the first machine. If the target interface identifier is determined to be equal to or a base for the apparent interface identifier, an affirmative indication to that effect is returned to the client. On the other hand, when the target interface is determined not to be equal to or a base for the apparent interface identifier the target interface identifier is then compared to a real interface identifier. In many embodiments, a call to the server host will have to be made in order to determine the real interface identifier. In some embodiments, a local cache can also be provided to store the results of such inquiries. The target interface identifier is then compared to the real interface identifier and a determination is made as to whether the target interface identifier is equal to or a base for the real interface identifier. The result is then returned to the client.

In embodiments that utilize a cache, the real interface checking step can first include the sub-step of checking whether the cache can make the determination as to whether the target interface identifier is equal to or a base for the real interface identifier. If so, the appropriate result is returned. If not, a call is made to the second computer to determine whether the target interface identifier is equal to or a base for the real interface identifier.

In one preferred arrangement, when a call must be made to the server host to check the real interface, a connection is established between the client host and an ORB daemon on the second computer. The ORB daemon is then used to identify a real interface identifier and an interface def for the target object. More specifically, the ORB daemon utilizes a target object identifier passed from the proxy to locate the real interface identifier and the interface def. The target object identifier is arranged to identify the target object to the second computer. The interface def is then used to determine whether the target interface identifier is equal to or a base for the real interface identifier and the results are returned to the proxy object located on the first computer.

In another preferred arrangement, when a call must be made to the server host to check the real interface, a connection is established between the proxy and the server process on the second computer. The determination as to whether the target interface identifier is equal to or a base for the real interface identifier is then made by the server process and the result is returned to the client.

In another aspect of the present invention, a method and apparatus for checking the type of an object located on a remote computer and for returning an output proxy object is disclosed. A cast checking function checks the cast of the proxy object by comparing the target interface identifier to the apparent interface identifier and to the interfaces of all of the parent objects from which the proxy object inherits. If the cast checking function is successful then the proxy object is returned, after being widened to the class associated with the target interface identifier. If the cast checking function is unsuccessful, then a remote type checking function as described above is performed. If this type checking function is unsuccessful, then the null proxy is returned. If the function is successful, then an output proxy is created by using a proxy factory table to indicate the appropriate proxy factory. The output proxy will be of the same kind as the proxy object, and of the same type as the target interface identifier. The output proxy will also be widened to the class associated with the target interface identifier.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
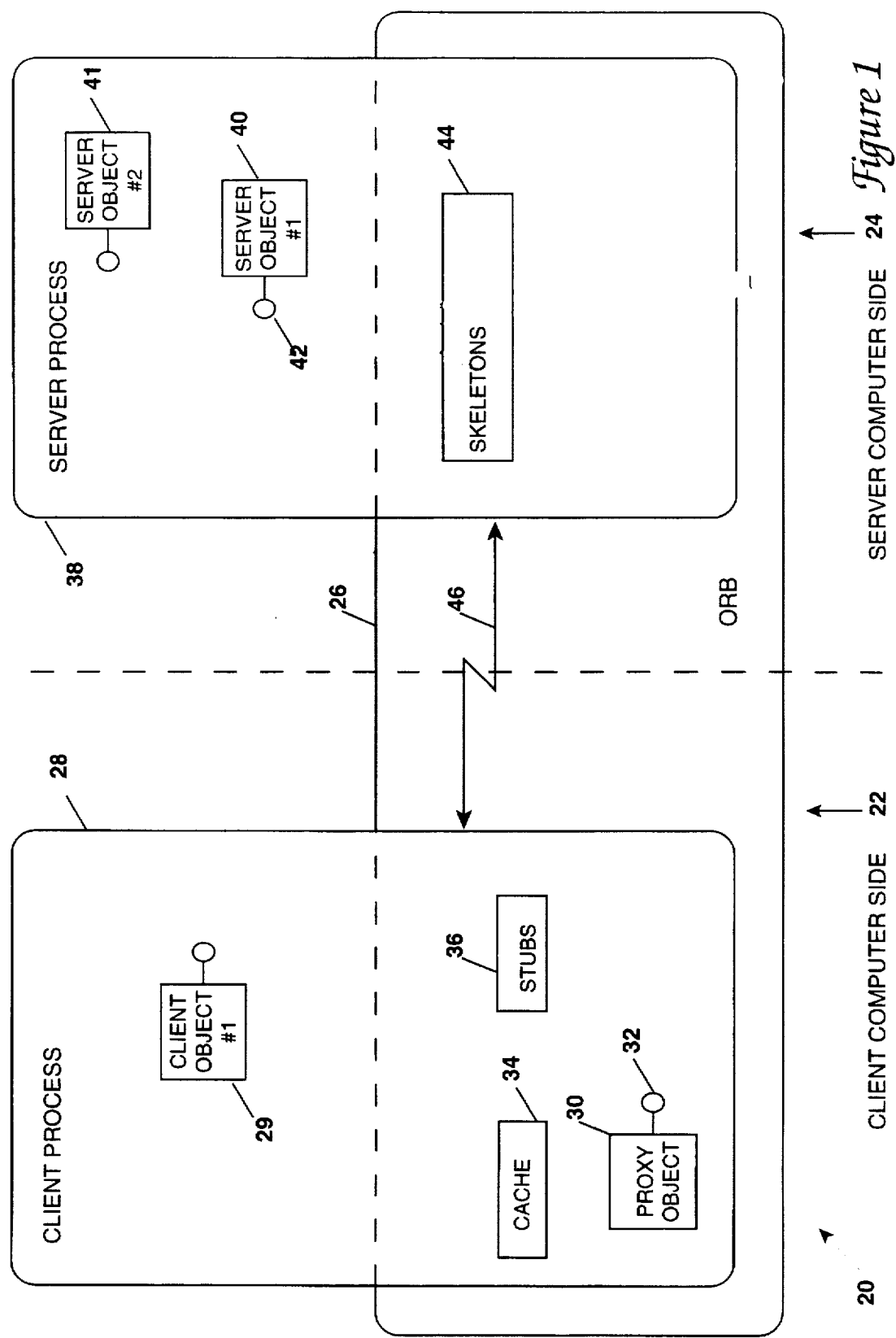
FIG. 1 is a representation of a distributed object system showing a client process running on the client computer, a server process running on the server computer, and objects within each process.

In the following description, for purposes of explanation, specific data and configurations are set forth in order to provide a thorough understanding of the present invention. The preferred embodiment described herein is implemented as a portion of the Distributed Objects Environment (DOE) system created by SunSoft, a business of Sun Microsystems, Inc. However, it will be apparent to one skilled in the art that the present invention may be practiced without the specific details and may be implemented in various computer systems and in various configurations, or makes or models of tightly-coupled processors or in various configurations of loosely-coupled multiprocessor systems.

I. DEFINITION OF TERMS

A distributed object system is in general an implementation of distributed object technology and refers to a computer system having distributed objects that communicate through an Object Request Broker (ORB).

The Object Request Broker (ORB) provides basic object communications and management services, thus forming the basis of a distributed object system. A object request broker daemon is a process running on a host computer which is the incarnation of the ORB on the host computer. Thus, each host within a distributed object system has its own ORB daemon. One of the purposes of the ORB daemon is to start server processes. Collectively, the ORB daemons form a portion of the overall ORB.

A client process is a software process that is running on or active on the client computer. A server process is a software process on the server computer. It is conceivable that the client process and the server process would be present on the same machine, and at times, may even be the same process.

An interface definition language (IDL) is a language that is used to define the interfaces of objects.

The term object or distributed object refers to an encapsulated package of code and data that can be manipulated by operations through the interface of the object. Thus, those of skill in the art will note that distributed objects include the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space: the address space of the client process. Distributed objects can be client objects or server objects, depending upon whether they are sending requests to other objects or replying to requests from other objects. Requests and replies are made through an Object Request Broker (ORB) that is aware of the locations and status of the objects.

A client object refers to an object that sends a request to another object for information or to perform a function. The object that provides the information or performs the function is referred to as the server object. In other words, a client object "calls" the server object to "invoke" a method that is defined on the server object. The server object is also referred to as the target object. Because objects are multilingual, client objects need not have knowledge of the implementation programming language of the server object, and vice-versa. Client objects and server objects in distributed object systems need only communicate in terms of the interface definition language. As noted above, the request by the client object, and the server object's reply, are handled by the ORB. It should be pointed out that the client object and server object can exist within the same process, or in different processes on the same host computer, or on two different host computers.

An object reference is an object that contains a pointer to another object. Additionally, an object reference can include a portion of memory (the "sub-object identifier") which can be used for identifying a sub-object. With the exception of the sub-object identifier, the creation and definition of object references will be familiar to those skilled in the art. Generally, object references exist only within a client process. They generally cannot be stored by one process and retrieved by a second process, nor can they be exported from a process. Object references are created when an object is created in a server process and can be passed via IDL operations. Each object reference can refer to only one object; however, several object references may refer to the same object.

To marshal a packet of information is to prepare this information for transfer over a network communications line. This often means organizing the data in a particular format in accordance with the network communications protocol being used.

To unmarshal a packet of information is to essentially reverse the marshaling procedure to thereby produce a packet of information which is meaningful in a non-network environment.

An object interface is a specification of the operations, attributes, and exceptions that an object provides. In one embodiment, object interfaces for distributed objects may be written using an IDL. As noted above, objects perform transactions through their interfaces. The use of interfaces therefore relieves an object from having to know other programming languages used to define the methods and data of other objects in the transaction.

A parameter is a data element sent from a client object along with a requested method to provide the server object with the necessary information to perform the requested service. A parameter is also referred to as an argument.

II. SPECIFIC EMBODIMENTS

In a distributed object operating environment, requests and replies are made through an Object Request Broker (ORB) that is aware of the locations and status of the objects.

One architecture which is suitable for implementing such an ORB is provided by the common object request broker architecture (CORBA) specification. The CORBA specification was developed by the object management group (OMG) to define the distributed computing environment world in terms of objects in a distributed client-server environment, where target objects are capable of providing services to clients requesting the service. In the following discussion, the terms "object" and "distributed object" will be used interchangeably, as the following invention is directed to both types.

Figure 11:
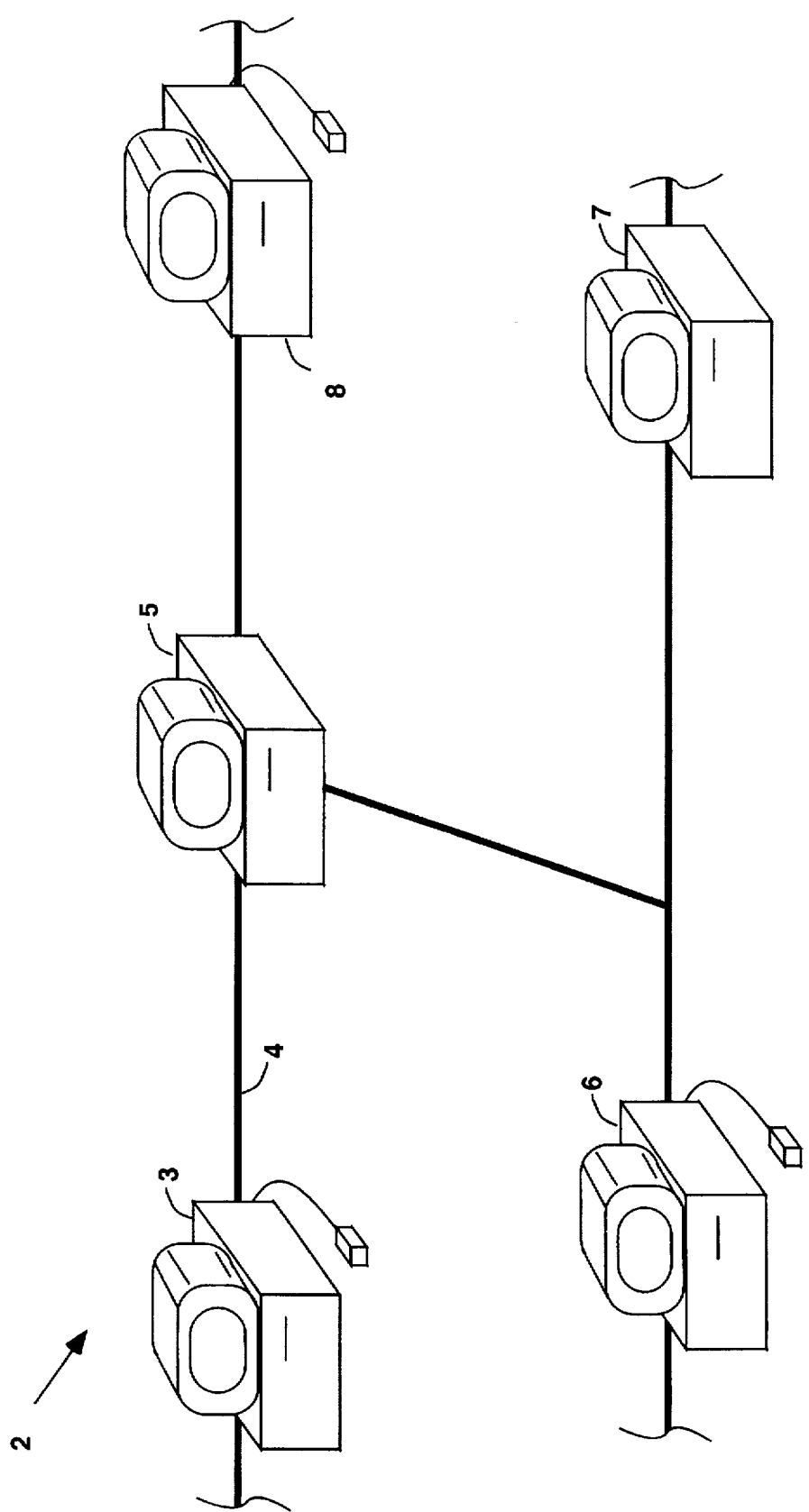
FIG. 11 is a pictorial illustration of various computers linked together in a computer network.

In a preferred embodiment of the present invention, distributed objects are located on one or more computers linked together by a network. The network may take any suitable form. By way of example a representative network arrangement 2 is illustrated in FIG. 11. The network arrangement 2 includes a first computer 3 which is coupled to a transmission line 4. The network 2 further includes a server, router or the like 5 in addition to other computers 6, 7, and 8 such that data and instructions can be passed among the networked computers. The design, construction and implementation of computer networks will be familiar to those of skill in the art.

Figure 12:
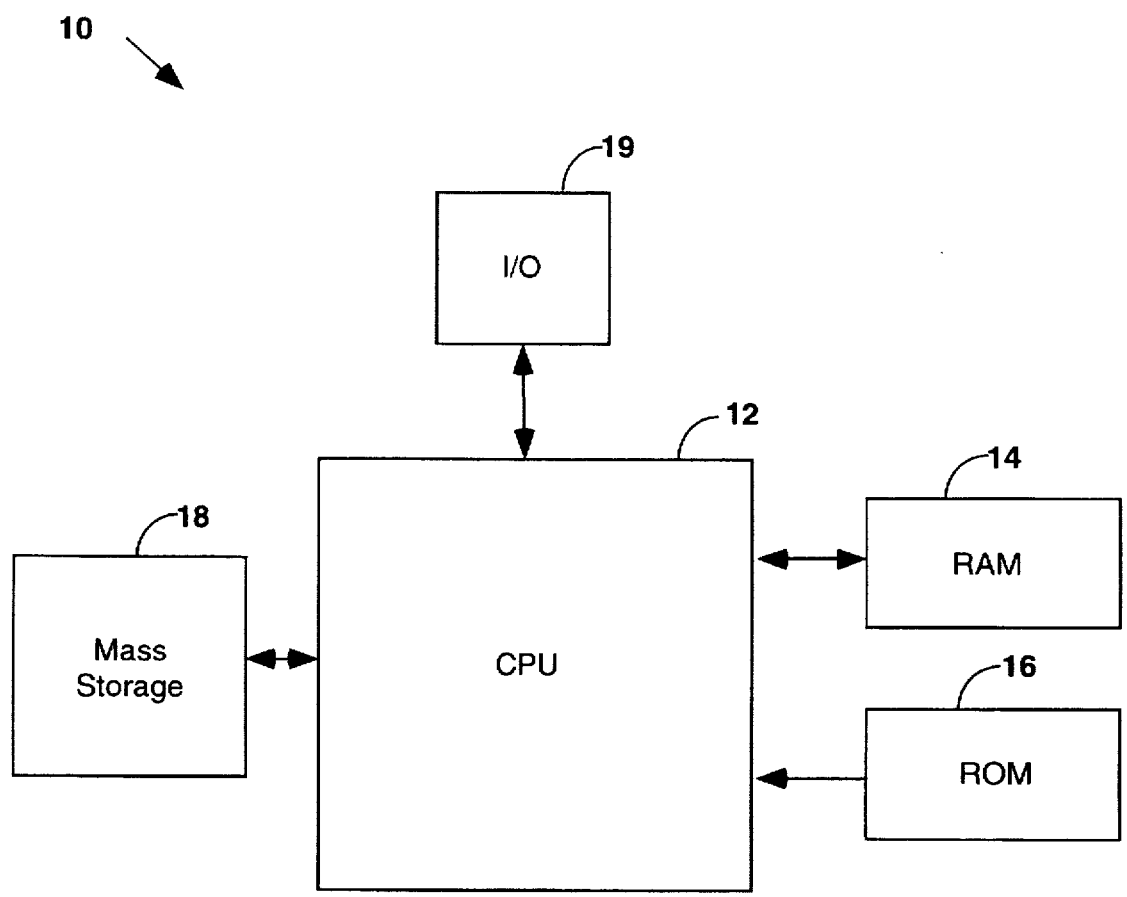
FIG. 12 illustrates diagramatically some of the major components of one of the computers illustrated in FIG. 11.

A representative computer 10 suitable for use as computers 3, 6, 7, and 8 of FIG. 11 is illustrated schematically in FIG. 12. Computer 10 includes a central processing unit (CPU) 12 which is coupled bidirectionally with random access memory (RAM) 14 and unidirectionally with read only memory (ROM) 16. Typically, RAM 14 is used as a "scratch pad" memory and includes programming instructions and data (including distributed objects and their associated data and instructions) for processes currently operating on CPU 12. ROM 16 typically includes basic operating instructions, data and objects used by the computer to perform its functions. In addition, a mass storage device 18, such as a hard disk, CD ROM, magneto-optical (floptical) drive, tape drive or the like, is coupled bidirectionally with CPU 12. Mass storage device 18 generally includes additional programming instructions, data and objects that typically are not in active use by the CPU, although the address space may be accessed by the CPU, e.g., for virtual memory or the like. Each of the above described computers further includes an input/output source 19 that typically includes input media such as a keyboard, pointer devices (e.g., a mouse or stylus) and/or network connections. Additional mass storage devices (not shown) may also be connected to CPU 12 through a network connection. It will be appreciated by those skilled in the art that the above described hardware and software elements, as well as networking devices are of standard design and construction, and will be well familiar to those skilled in the art.

Turning now to FIG. 1, FIG. 1 symbolically illustrates an example of a distributed object system 20. In an embodiment, the distributed object system is implemented by the Distributed Object Environment (DOE) of Sun Microsystems, Inc. The system includes a client computer 22, a server computer 24, and an Object Request Broker (ORB) 26 which is present on each computer and throughout the distributed object system 20. Also shown is a client process 28 which contains a client object 29, a proxy object 30, its apparent interface 32, a local client cache 34 and stubs 36. A server process 38 contains objects 40 and 41, the real interface 42 of object 40, and skeletons 44. A network communication device 46 provides communication between the client computer 22 and the server computer 24.

The distributed object system 20 shows only one client computer 22 with a client process 28, and only one server computer 24 with a server process 38. However it should be appreciated that there could be any number of computers and processes in a distributed object system, and there may be many processes on a given computer. Also, a given computer or process could be either a client or a server, depending upon whether the computer or process is requesting information about an object or receiving such a request. If a process is requesting information about a target object, it is termed the client process, and if a process contains the target object, it is termed the server process. Also it is conceivable that both the client process 28 and the server process 38 could be running on the same host computer. Although the methods describe herein may be used to handle same host inquiries, in most cases, more efficient procedures would be used to handle same host inquiries. The client computer 22 and the server computer 24 may be any type of computing device capable of supporting objects, including super-computers, minicomputers, workstations, personal computers, personal digital assistants and other electronic computing devices. In general, the client process 28 and the server process 38 are software processes running on a computer in a defined memory space. These processes may be written in different programming languages. A process could be an operating system, an application program, a database, a device driver, network communications or other software based program.

Contained within the client process 28 memory space are the stubs 36, any number of client objects 29, any number of proxy objects 30, and a local client memory cache 34. The stubs 36 are source code components that allow the client process 28 and server process 38 to communicate. A stub receives a function or procedure call in the native language of the client process 28 and uses support libraries to call to the server process 38. An analogous piece of software in the server process 38 are the skeletons 44. A skeleton performs an inverse mapping to what a stub provides. A skeleton takes information that was encoded for the call and reconstitutes data structures or object references in the native programming language for the server process side of the call. Both the stubs 36 and the skeletons 44 are partially implemented in the ORB. There will be a unique skeleton and stub for each interface, and thus any number of stubs in the client process and skeletons in the server process, respectively. The Interface Definition Language (IDL) compiler preferably generates the stubs and the skeletons.

Figure 5:
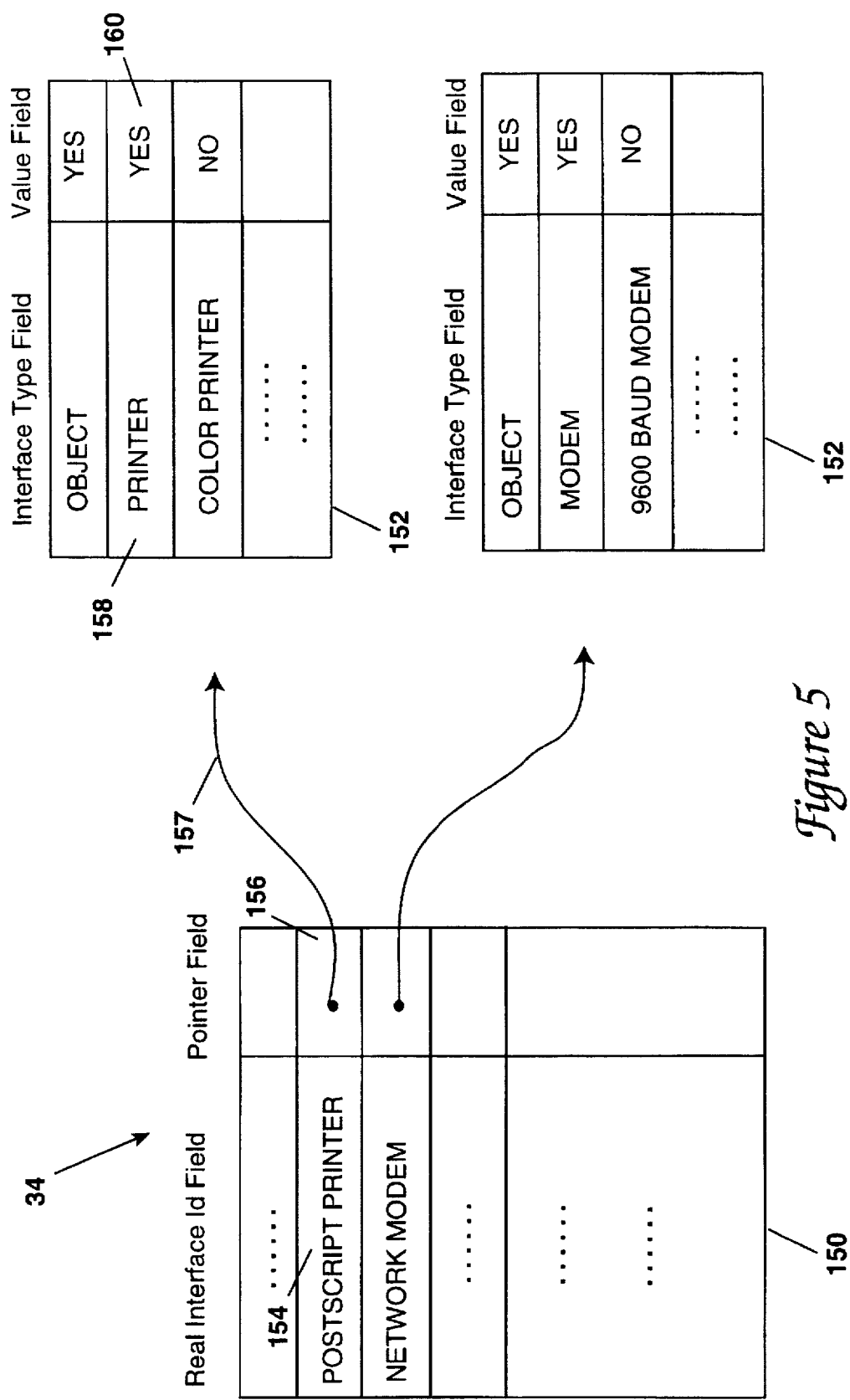
FIG. 5 is a symbolic representation of tables that make up a client cache.

As will be described in more detail below, the client cache 34 is used in some embodiments to speed the determination of the type of an object. The drawback of using such a cache is that it adds some overhead to the system. In the described embodiments in which it is used, the client cache 34 is in the same memory space as the client process 28. If the specific type of an object has been determined earlier, this information will be stored in the client process memory space where it can be accessed much faster than making a call over the network 46. FIG. 5 illustrates the structure of the client cache 34. The client cache 34 is essentially a main table 150 with pointers to value tables 152. Each row in the main table 150 has a real interface ID (real interface identifier) field 154 and a pointer field 156. Each row entry in the main table 150 will be associated with a unique value table 152. That is, for each real interface ID contained in the real interface ID field 154, there will be a pointer 157 contained in the pointer field 156 that points to unique value table 152.

Each row entry of a value table 152 has an interface type field 158 with a corresponding value field 160. Thus, for a particular interface type contained in the interface type field 158, there will be a corresponding value contained in the value field 160. The rows in the main table and value tables are filled in two ways. Rows are created and values assigned at compile time if the compiler has this information from the stubs and skeletons. Also, as the client process 28 makes object calls and learns this information, it will create these rows and tables for future use. How the client cache 34 is specifically used is described below.

Returning now to FIG. 1, the client object 29 is an object present in the memory space of the client process 28. A call to a target object 40 (for example) to determine its type may originate from the client object, from the client process itself, or from another entity in the client process. The proxy object 30, as its name implies, serves as a proxy for the actual target object that the client process is trying to call. Thus, the client process will create a proxy for each target object with which it is in communication. The proxy contains the object reference for the target object, thus allowing the proxy to find the location of the target object. FIG. 1 illustrates a situation in which the target object 40 that the client process wishes to call is located on another computer 24, in another process 38. In this situation, the client process 28 will make a call to the proxy object 30 (thinking that it is calling the target object 40). As the proxy object is in the same address space as the client process, the call to the proxy can be performed with a C++(or other suitable) function call. The proxy object will perform the marshaling and send the information to one of the skeletons over the network 46. The skeleton will act like the client process while querying the target object 40. The skeleton will receive the desired information, pass it back to the proxy object 30 which in turn acts like the target object 40 in returning the result to the client process 28.

As shown in FIG. 1, the ORB 26 is present on each computing device (in this case the client computer 22 and the server computer 24) and also across the network 46. The ORB provides basic object communication and management services.

As defined above, an object's interface specifies the nature of the object. Here, the real interface 42 of the target object 40 contains the actual information about the object, and the apparent interface 32 of the proxy object 30 may contain general information about the target object. An interface ID (interface identifier) is part of an interface and identifies the type of an object. For example, the interface ID may indicate that an object is of a type "printer". Thus, the real interface ID of the real interface 42 may indicate specific type information about the target object (e.g. "I am a postscript printer"), and the apparent interface ID (apparent interface identifier) may indicate general type information (e.g. "I am a printer").

A general type is said to be a "base" for a specific type if the specific type is a member of the class of objects that the general type describes. For example, the more general type "printer" is a base for the more specific type "color postscript printer" because a color postscript printer is a printer. The type "color postscript printer" would not be a base for the type "color printer" because a color printer is not necessarily a color postscript printer. In object-oriented programming terms, it can be said that a general type is a base for a specific type if the specific type is a sub-class of the general type. Thus, since an interface ID indicates the type of an object, it is possible to compare and determine if a target interface ID (target interface identifier) is a base for either an apparent interface ID or a real interface ID.

Figure 2:
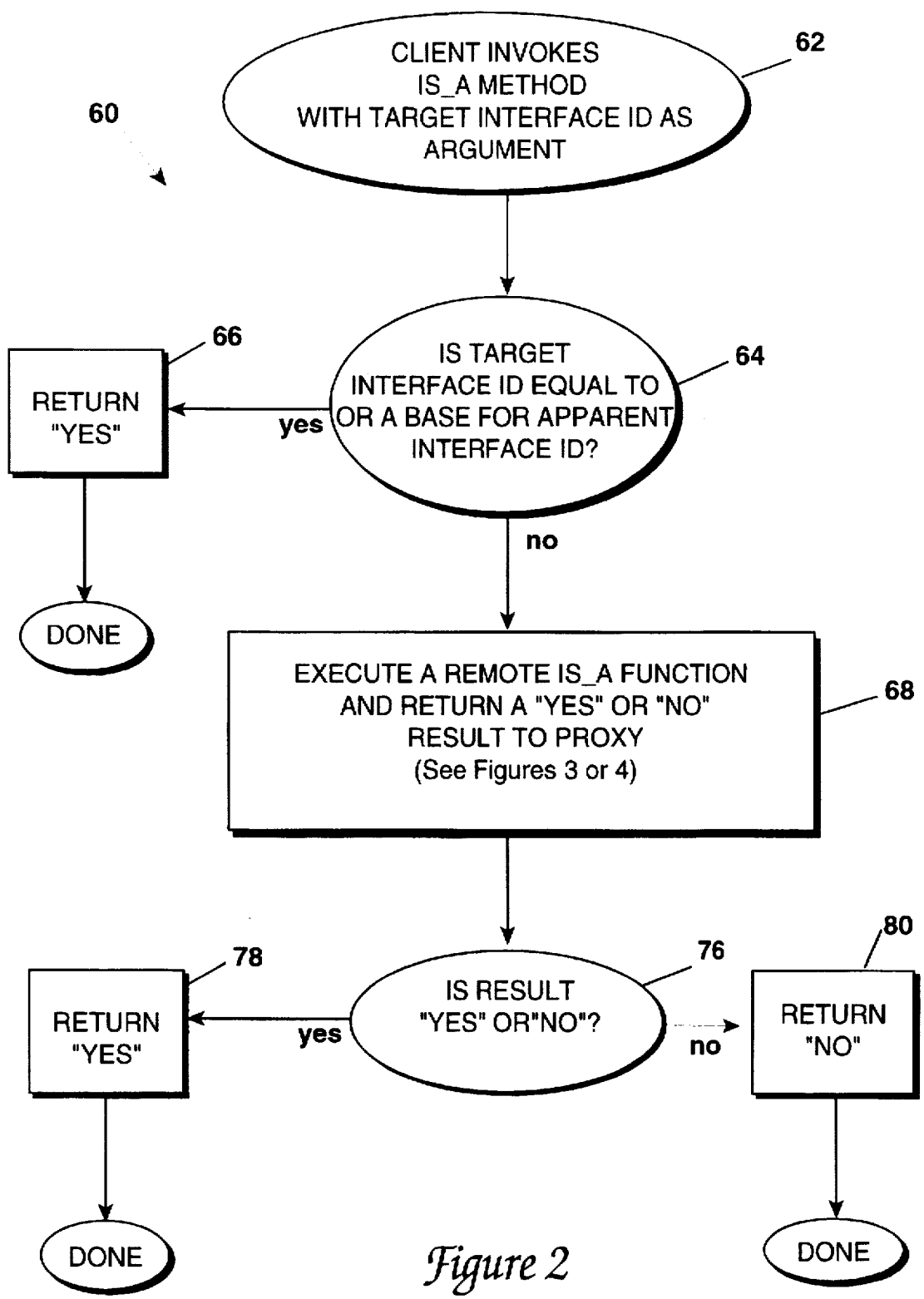
FIG. 2 is a flow chart describing a method for determining whether a target object is a specific type of an object in accordance with one embodiment of the invention.

Referring next to FIG. 2 a method 60 by which a client may determine the type of a target object in accordance with one embodiment of the invention will be described. In the described embodiment, this is accomplished by executing an IS_A command. The goal of the IS_A method is to determine whether the target object 40 supports a specific interface. In some cases, the client may know certain general information about a target object, but may not know whether the target object is of a specific type. For example, the client process 28 may know that the target object is a printer, but it wishes to ask the target object, "Are you a color postscript printer?" The IS_A method is a Boolean function that will return "Yes" or "No". In other cases, the client may not know anything about the target object's type and simply needs to know whether it is a specific type of object. For example, the client may wish to know whether the target object is a "folder", which is presumed to have certain properties.

Initially, in step 62, the client process 28 invokes the IS_A method by calling the proxy object 30 with the target interface ID as the argument to the method. The target interface ID is the information that the client process is trying to determine about the target object. That is, the client is asking whether the target object supports the interface identified by the target interface ID. Using the above example, the target interface ID would be "color postscript printer".

The proxy may know the general type of the target object, or even its specific type. The proxy will always have some type information about the target object, but it may only know that the target is of the type "object", the root type. This type information that the proxy has is the apparent interface ID. The apparent interface ID is stored as a field in the proxy object or is implicitly known to the proxy. By way of example, in a system implemented in C++, the C++ type information may be used to determine some general type information about the target object. Each proxy object will have a function (called a CHECK_ID function) to implement the IS_A method, but each function will be different, depending upon the type of the proxy. The function may be implemented in any suitable form. By way of example, it may be a C++ virtual function. In step 64, the target interface ID is compared to the apparent interface ID contained in the proxy object. If the target interface ID is a base for or is the same as the apparent interface ID then the IS_A method returns "Yes" in step 66 and terminates. If not, the IS_A method moves to step 68.

In step 68 a call is made to execute a remote IS_A function. This step effectively makes a call over the network because needed information has not been found in the proxy object contained in the address space of the client process. Two suitable methods of performing a remote IS_A function are described below, and shown in FIGS. 3 and 4 respectively. In effect, the remote IS_A function asks the server directly whether the target object is of the desired type. Thus, it determines whether the target interface ID is the same as or a base for the real interface ID. In response it receives a Boolean "Yes" or "No" answer.

After a response is received, Step 76 determines whether the remote IS_A function returned a "Yes" or "No" result. If the result is "Yes", step 78 returns a "Yes" and the IS_A method terminates. If the result is "No", step 80 returns a "No" and the IS_A method terminates.

Figure 3:
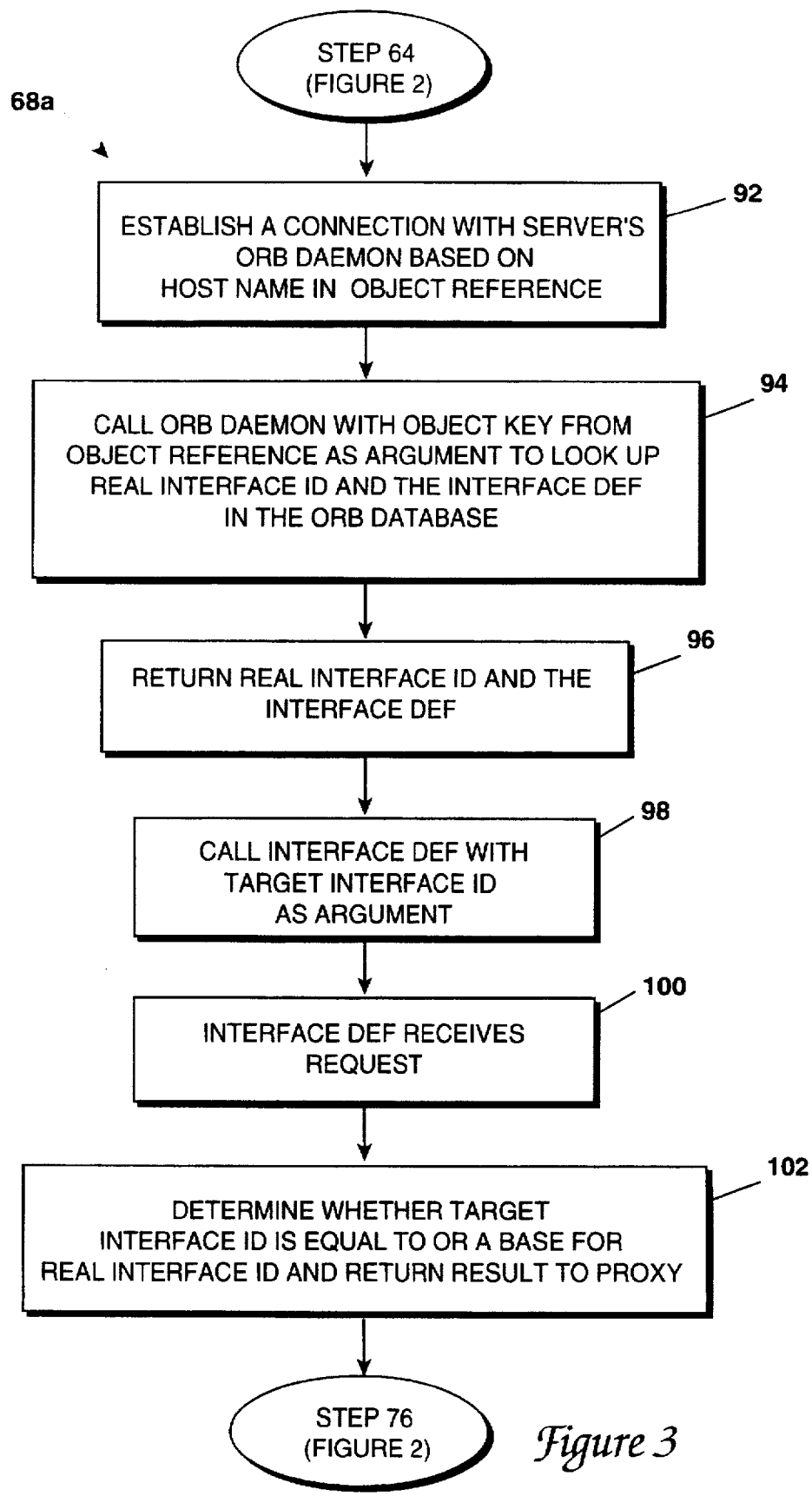
FIG. 3 is a flow chart describing a method of implementing the remote IS_A function step of FIG. 2 in accordance with one embodiment of the invention.

Referring next to FIG. 3 a process 68a suitable for performing a remote IS_A function (step 68 of FIG. 2) in accordance with a first embodiment will be described. In this embodiment, the real interface ID is not part of the object reference. Initially, in step 92, the proxy object establishes a connection with the ORB daemon on the server's host machine. The identity of the host is provided in a host name field in the object reference. This information is used by the object request broker in order to identify the network port number of the server's ORB daemon, which in turn facilitates the establishment of a connection. By way of example, a suitable mechanism for establishing and managing connections in a distributed object system is described in Brownell et al.'s co-pending U.S. patent application Ser. No. 08/408,316, filed Mar. 22, 1995, which is incorporated herein by reference in its entirety.

Figure 6:
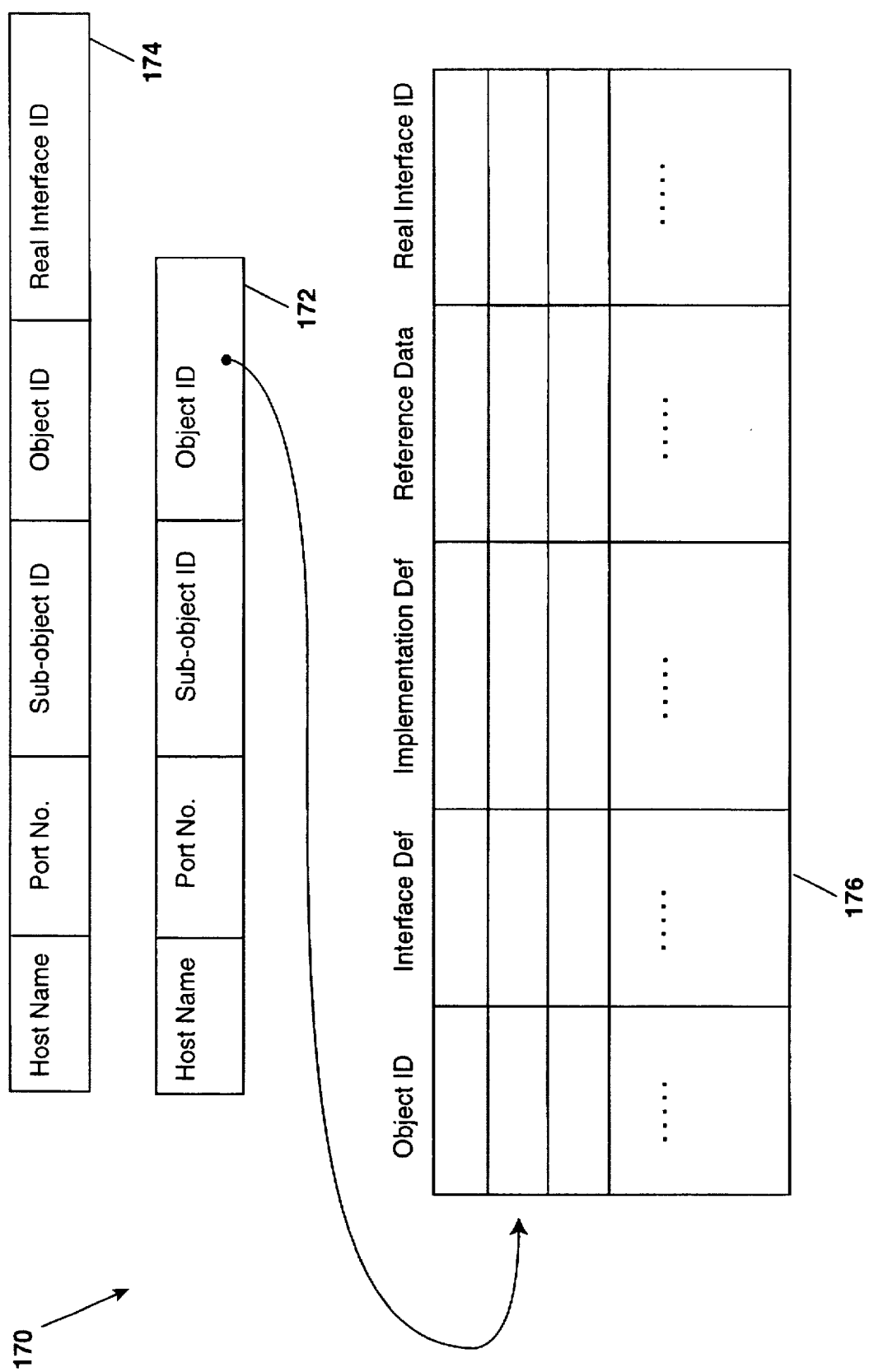
FIG. 6 shows two embodiments of object references and also how one embodiment of the object reference is used to access the real interface ID in the BOA database.

After a suitable connection has been established, a call is made in step 94 from the client to the server's ORB daemon asking for the real interface ID and the interface def for the target object. As shown in FIG. 6, the object ID from the target's object reference 172 is used as the argument for this call. As this object reference is contained in the proxy object, the client has direct access to the object ID. The ORB daemon then uses the object ID to access a particular row in the server host's BOA database 176 which identifies the interface def and real interface ID for each of the distributed objects (including the target object) which are available on the server's host machine. The interface def is an object in an interface repository that contains information on all the interfaces of the distributed object system. The interface repository is described in the interface repository chapter of the CORBA Specification, which is incorporated herein by reference. The interface def has its own "compare" operation for comparing the target interface ID to the real interface ID. This operation may be implemented in any suitable form, such as a C++function.

Returning now to FIG. 3, once the ORB daemon has identified the interface def and real interface ID, they are returned in step 96 to the proxy object. In step 98, the compare operation of the interface def is called by the proxy object with the target interface ID as the argument. In step 100, the interface def object receives this request. In step 102, the compare operation of the interface def object compares the target interface ID to the real interface ID and returns the result to the proxy. Next, control returns to step 76 of FIG. 2 which processes the result of the compare operation.

Figure 4:
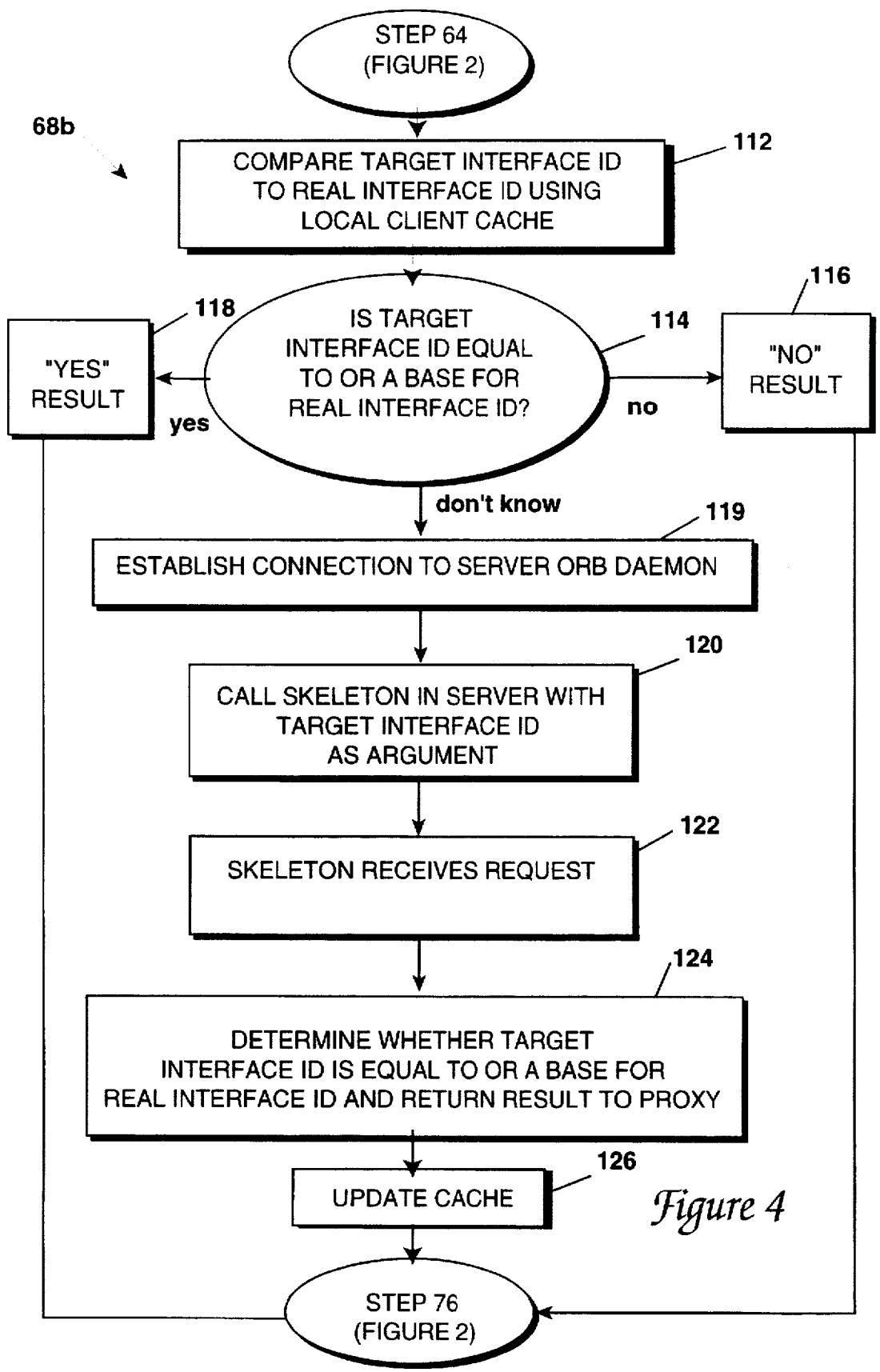
FIG. 4 is a flow chart describing a method of implementing the remote IS_A function step of FIG. 2 in accordance with a second embodiment of the invention.

Referring next to FIG. 4, a second implementation 68b for the remote IS__A function which is step 68 of FIG. 2 will be described. In this second embodiment, the real interface ID is part of the object reference. Initially, in step 112 of this embodiment, the target interface ID is compared to the real interface ID using the local client cache. FIG. 5 shows a symbolic representation of the client cache 34, which has been explained above. Referring to FIG. 5, the comparison is done as follows. As the real interface ID is known from the object reference, this embodiment first looks in the main table 150 through the real interface ID fields 154 to find the appropriate real interface id. Then the corresponding pointer field 156 is used to access a pointer 157. This pointer 157 will point to a value table 152 (for example) that may already have comparison information regarding the target interface ID. For example, if the real interface ID is "monochrome postscript printer", and the target interface ID is "printer", the value would be "Yes". The value (or result) is "Yes" because a postscript printer is a printer. Likewise, if the target interface ID is "color printer", the value would be "No" because a monochrome postscript printer is not a color printer. It may be that the client cache 34 does not have entries in a value table 152 yet for a particular target interface ID. In this case, the client cache cannot provide a "Yes" or "No" value.

Returning now to FIG. 4, step 114 processes the result obtained from using the client cache. If the target interface ID is a base for or equal to the real interface ID, then step 118 produces a "Yes" result which is returned to the client in step 76 of FIG. 2 as explained above. If not, then step 116 produces a "No" result which is also returned in step 76 of FIG. 2. If the client cache does not have information (or does not have sufficient information) regarding the relation between a particular real interface ID and a particular target interface ID, then the "don't know" branch is followed to step 119.

As in the previously described embodiment, a connection with the server host's ORB daemon must initially be made in step 119. Then, in step 120, the proxy object makes a remote IS__A call to the skeleton in the server process using the target interface ID as the argument. This call across the network is necessary only when the local client cache in the memory space of the client process does not contain the needed information. In step 122, the skeleton receives this request from the proxy. In step 124, the skeleton performs a comparison operation implemented in C++ to compare the target interface ID to the real interface ID. As the skeleton is in the same memory space as the server process, the skeleton has direct access to the real interface ID. That is, as there is a unique skeleton per interface, the skeleton will inherently have access to the real interface ID.

Step 124 determines whether the target interface ID is equal to or a base for the real interface ID and returns the result to the proxy. Next, step 126 updates the local client cache with the result, a "Yes" or a "No" value, and then returns to step 76 of FIG. 2 as explained above. The client cache is updated as follows. Referring again to FIG. 5, for a given real interface ID in the main table 150 of the client cache 34, a pointer 157 indicates the value table 152 for that real interface ID. The target interface ID that is the subject of the query is then entered into the interface type field 158 of the value table 152 along with the value that was returned by the skeleton ("Yes" or "No") into the value field 160. In this way, the result of this call to the skeleton can be saved locally in the client cache 34 for future use. The advantage is that if the same IS__A query is invoked again, the result can be obtained quicker in the local client cache instead of making a call to the skeleton over the network.

In a third possible embodiment of the IS__A function, steps 94 through 98 of FIG. 3 could be combined. The cache would be built into the ORB daemon, and the ORB daemon would call the interface def.

FIG. 6 shows the object reference—BOA database relationship 170. In a first embodiment of the IS__A method the object reference 172 is variable length word that contains information related to the target object. This object reference is contained in the proxy object. The object reference 172 has fields that contain information about the host name, port number, object ID, and sub-object ID. The host name is the name of the machine on which the target object resides, and the port number is the network port number for the server process's ORB daemon. In a second embodiment of the IS__A method, the object reference 174 is similar to the object reference of the first embodiment, but the object reference 174 also has a field that contains the real interface ID.

Also shown in FIG. 6 is the BOA database 176. The BOA database 176 is a table of information about each object in the distributed object system. Each machine in the distributed object system will have its own BOA database that keeps track of all the objects on that machine. Each row of the table corresponds to an object, and a row is added and filled with information each time that an object is created. The ORB daemon builds and maintains this table. This table 176 contains information on each object such as the object ID, the interface def, the implementation def, reference data and the real interface ID. The interface def and implementation def are object references to objects of type "InterfaceDef" and "ImplementationDef", which stand for interface definition and implementation definition. Both are described in the OMG document "The Common Object Request Broker: Architecture and Specification", No. 93.12.43, December 1993, which is herein incorporated by reference. This table 176 can hold other information besides the data shown.

In a distributed object system, the ORB may have many object adapters. In a DOE embodiment of a distributed object system, there is only one object adapter which is the Basic Object Adapter (BOA). However, it is contemplated that there could be many object adapters for the ORB, in which case there would be a table such as the BOA database 176 corresponding to each object adapter.

Figure 7:
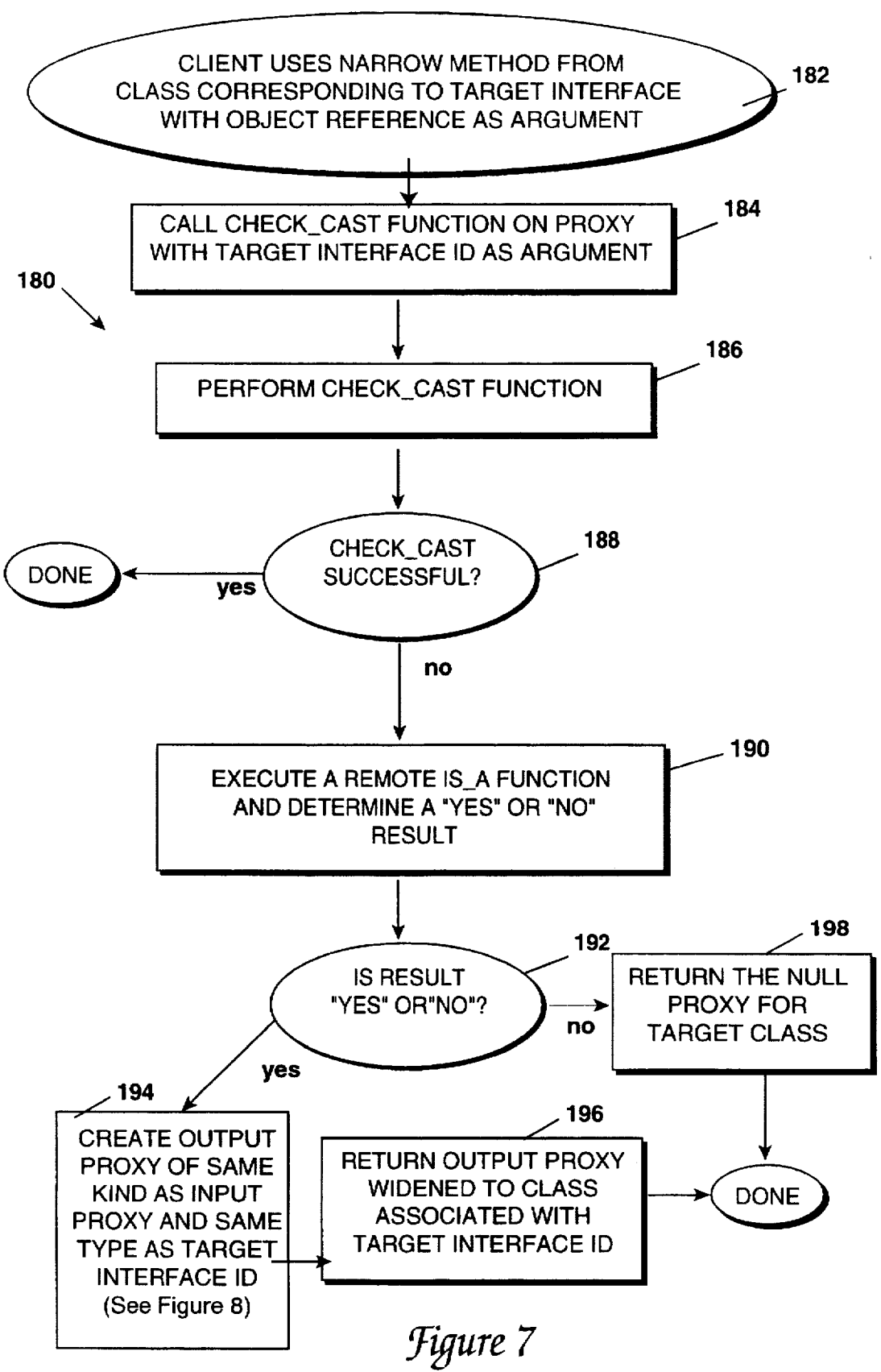
FIG. 7 is a flow chart describing a method for determining the type of a target object and also for returning a proxy object in accordance with one embodiment of the invention.

Referring next to FIG. 7 a NARROW operation 180 in accordance with one embodiment of another aspect of the invention will be described. The goal of the NARROW method is to return a new proxy object to the client process. The new proxy will typically have an apparent type that is more specific than that of the input proxy. In effect, the NARROW operation will create a new proxy (referred to herein as an output proxy) in the same memory space in the client process as an old proxy (referred to herein as the input proxy). This new output proxy will also be of the same kind as the input proxy. The input proxy is the term given to the original proxy object upon which the client process makes it first call. In this embodiment of the NARROW method, there are three implementations of proxy objects: local, remote and null. A local proxy object is used for those target objects which are in the same memory space as the client process. A remote proxy object is used for those target objects which are in the server process memory space that is separate from the client process. A null proxy object represents no object. A null proxy can be implemented by returning a null object, a null pointer or by throwing an exception. It is also contemplated that there could be other kinds of proxy objects and indeed the flexibility of handling other types of proxies is considered a feature of the described system. By way of example, other kinds of proxies could include replicated proxies, which represent the same object, but implemented by other server processes on other machines.

Referring now to FIG. 7 in detail, the NARROW invocation 180 begins in step 182 when the client process makes a call to the class corresponding to the target interface to implement its NARROW method. The object reference is used as the argument. For example, if the target interface ID is "color printer", then the NARROW method for the class "color printer" will be used. For each class of objects, there will be a unique NARROW method defined. Also, there is a unique class defined for each interface.

Next, in step 184 the NARROW method makes a call to the input proxy object to perform the CHECK_CAST function with the target interface ID as the argument. Step 186 performs the CHECK_CAST function as will be described in more detail below with reference to FIG. 10. CHECK_CAST will check the inheritance tree of the proxy object interface to determine if the target interface ID is equivalent to the apparent interface ID of the proxy object itself, or is equivalent to any of the interface ID's of any of the parents. For example, if the apparent interface ID of the proxy object is "printer", and the proxy object inherits (has parents) from the classes "color printer" and "postscript printer", then the CHECK_CAST function will compare the target interface ID to "printer", "color printer" and "postscript printer". The function CHECK_CAST will return either the proxy object or a null. The CHECK_CAST function will now be described in detail.

Figure 10:
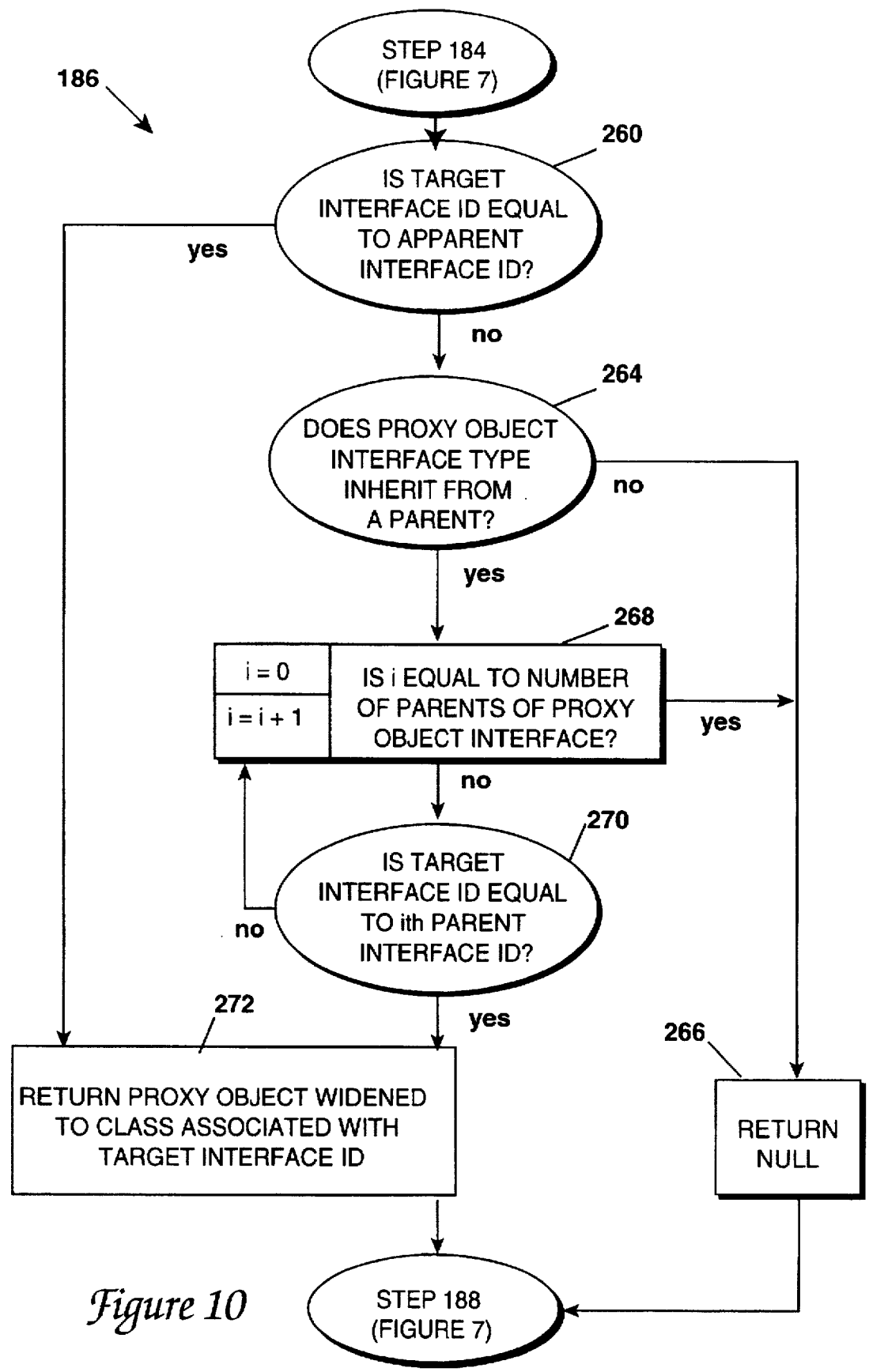
FIG. 10 is a flow chart describing the steps used to implement the CHECK_CAST function of FIG. 7.

Referring now to FIG. 10, the CHECK_CAST function 186 is shown. In step 260 the target interface ID is compared to the apparent interface ID of the proxy object. An equals comparison is used. For example, if the target interface ID is "color printer", then the condition is satisfied only if the apparent interface ID is exactly "color printer" as well. Note that this comparison operator is different from the comparison operator used in step 64 of FIG. 2. In step 64, the comparison operator is "equal to or a base for". Here in step 260 of FIG. 10 the comparison operator is "equal to".

If the target interface ID is equal to the apparent interface ID, then in step 272 a pointer to the proxy object itself is returned and the proxy object is also widened to the class associated with the target interface ID. Widening is required because the proxy's class is a combination of both the interface class and the implementation class. In C++ multiple inheritance is used. The result of NARROW must be a proxy type of just the interface class, so widening is used to hide the implementation class. As the CHECK_CAST function is now finished, control returns to step 188 of the NARROW method. Step 188 of FIG. 7 is described in detail below. In step 260 of FIG. 10 if the target interface ID is not equal to the apparent interface ID, then the function moves to step 264.

Step 264 determines if the proxy object has any parents in the interface inheritance tree. As used in this function, "parents" is defined to be both direct and indirect parents. For example, if an object does not inherit from any parent classes, then step 264 would result in "no". In this case, a null or zero is returned and control flows to step 188 of the NARROW method. However, if an object does inherit from one or more parents, then the result is "yes" in step 264 and control moves to step 268.

Step 268 is a loop that allows the CHECK_CAST function to compare the target interface ID to the interface of each parent in the inheritance tree. However, parent classes associated with the types "remote proxy" or "local proxy" will not be used for comparison. This loop could be implemented in various ways. In one embodiment, this loop could be implemented using a recursive function that walks up the inheritance tree, comparing the interface ID of each parent to the target interface ID. In fact, the complete CHECK_CAST function could be implemented as a recursive function. Also, the inheritance tree will not have cycles, but is implemented as a directed, acyclic graph. Since the IDL is defined so that the interface inheritance tree cannot have cycles, the recursive function will terminate. In another embodiment that is non-recursive, the IDL compiler would create C++ code that would essentially "flatten out" this inheritance tree and provide explicit comparison code for each node in the inheritance tree.

Continuing with step 268 of FIG. 10, step 268 first initializes a counter "i" to zero, and then checks to see if counter "i" is equal to the number of parents of the proxy object. If counter "i" equals the number of parents, this indicates that the interface ID of all parents have been compared to the target interface ID and no match has been found. In this case, step 266 then returns a null and control moves to step 188 of the NARROW method. However, if not all parents in the inheritance tree have been checked, then counter "i" will be less then the number of parents and control will move to step 270. In step 270, the target interface ID is compared to see if it is equivalent to the interface ID of the current parent node. If they are equivalent, then a match has been found and control moves to step 272. For example, if the proxy object has apparent interface "color postscript printer" which inherits from "postscript printer", and the target interface ID is "postscript printer", then there will eventually be a match in an iteration of step 270. Step 272 will return the proxy object widened to the class associated with the target interface ID. After step 272, control returns to step 188 of the NARROW method.

In step 270, if the target interface ID is not equal to the parent interface ID, then control shifts back to step 268, counter "i" is increased by one, and the next parent interface ID up the inheritance tree is checked against the target interface ID. This loop through steps 268 to 270 continues until either a target interface ID matches a parent interface ID (step 272), or until all parent interfaces have been compared and no match found (step 266).

Step 188 of FIG. 7 is a decision block based on the results of the CHECK_CAST function. The function CHECK_CAST is successful if a match occurred and the proxy object was returned. CHECK_CAST is unsuccessful if no match was found, resulting in a null being returned. In step 188, if CHECK_CAST was successful then the NARROW method is done and there is no need to further narrow the proxy object. On the other hand, if the CHECK_CAST function is unsuccessful, then the method continues to step 190. Step 190 then executes a remote IS_A function and receives a "Yes" or "No" result as described above. By way of example, either of the remote IS_A functions described above with reference to FIGS. 3 and 4 work well to perform this step. The decision block 192 then reviews the result from the remote IS_A function. If the result is "No", then step 198 returns a null proxy object for the target class and the NARROW method terminates. A "No" result indicates that the target object does not support the target interface ID. For example, if the target object is a postscript printer, and the target interface ID is "modem" then the result will be "No". A "Yes" result would indicate that the target object does support the target interface ID. For example, if the target object is a color postscript printer, and the target interface ID is "color postscript printer" then the result will be "Yes".

If the result in step 192 is "Yes", then step 194 will create a new output proxy. This new output proxy will be of the same kind as the input proxy and of the same type as the target interface type. This step 194 is explained in more detail below with reference to FIG. 8. After the new output proxy has been created, step 196 returns this output proxy widened to the class associated with the target interface ID. The output proxy is returned to the client process in the memory space of the client process. After step 196 the NARROW method is complete.

Figures 8, 9:
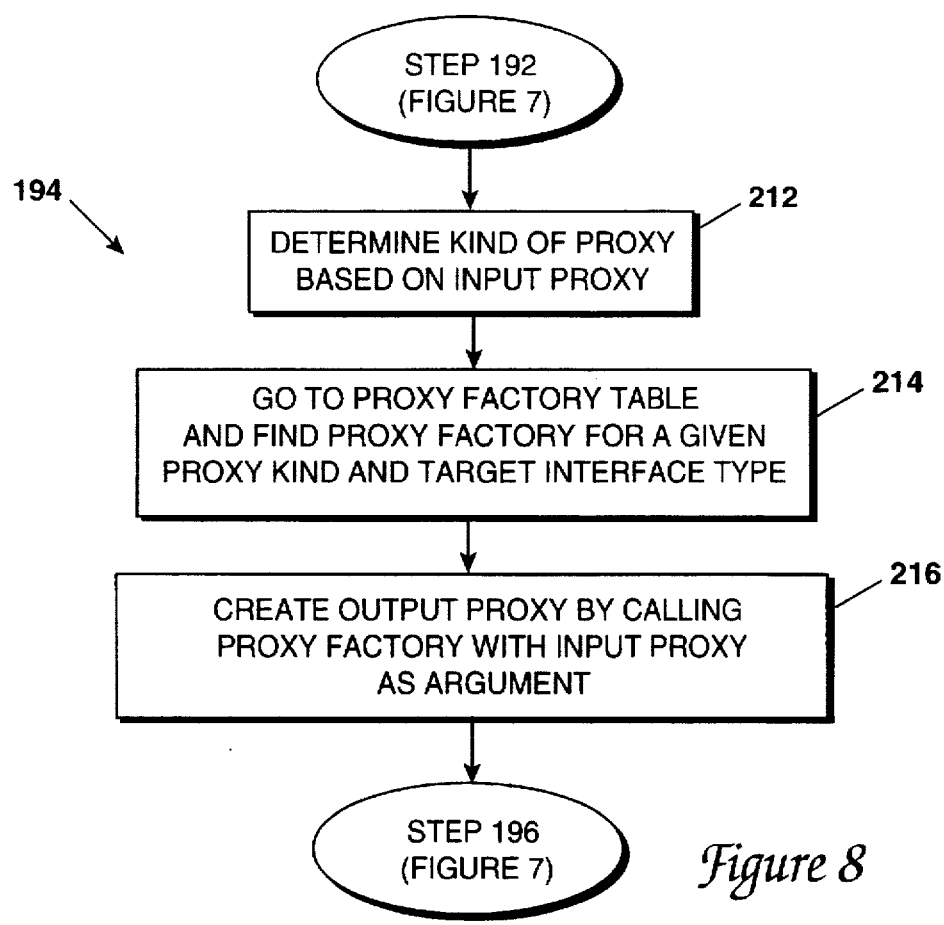
FIG. 8 is a flow chart describing the steps used to create an output proxy of the same kind as the input proxy and of the same type as the target interface in accordance with one embodiment of the invention.
FIG. 9 is a representation of a proxy factory table.

Referring next to FIG. 8, the new proxy output creating step 194 of FIG. 7 will be described in more detail. Initially, step 212 determines the kind of output proxy needed based on the kind of the input proxy. The output proxy will be of the same kind as the input proxy. By way of example, in the example given above, there were three kinds of proxies: local, remote, or null. Thus, in that example, if the input proxy was a local proxy, the output proxy would be a local proxy. If the input proxy was a remote proxy, the output proxy would be a remote proxy. Again, one of the features of the invention is that it permits the use of other kinds of proxies as well. The only limitation is that if other kinds of proxies are used, the output proxies would be constrained to be the same kind as their input proxies. After the kind of the input proxy has been determined, step 214 uses a proxy factory table to determine the appropriate proxy factory for the determined proxy kind and the given target interface type. By way of example, the structure of a representative factory table 240 is illustrated in FIG. 9.

Referring now to FIG. 9, each row 242 in factory table 240 represents a class of objects, while each column 244 represents a different kind of proxy. Rows and columns intersect in cells 246. Based upon a particular kind of proxy (a column), and a given target interface type (a row), the table 240 will indicate the appropriate proxy factory to use to create the new output proxy. For example, if the kind of input proxy is "Remote", and the given target interface type is "Printer", then the appropriate proxy factory is "#1". This factory will produce proxy objects of interface type "Printer" and kind "Remote". There will be a unique proxy factory for each cell 246. That is, the C++ code that implements a given proxy factory will in general be different, but portions of the proxy factory implementing code may use common code. The IDL compiler registers the proxy factories in the proxy factory table.

Returning now to FIG. 8, once the appropriate proxy factory is determined, step 216 creates an output proxy by calling the appropriate proxy factory with the input proxy as the argument. The proxy factory returns the desired output proxy, which is of the same kind as the input proxy and of the same type as the target interface ID. The logic then flows to step 196 as described above with reference to FIG. 7, wherein the output proxy is widened to the class associated with the target interface ID.

Although only a few embodiments of the present invention have been described in detail, it should be understood that the present invention may be embodied in many other specific forms without departing from the spirit or scope of the invention. Particularly, regarding the network communications device 46 of FIG. 1, it need not necessarily be an electronic, cabled network. That is, the transmission line 4 of FIG. 11 may be embodied in another form. For example, the computers may communicate via infrared waves, microwaves or other electromagnetic media. Therefore, the present examples are to be considered as illustrative and not restrictive, and the invention is not to be limited to the details given herein, but may be modified within the scope of the appended claims.

We claim:

1. An apparatus for narrowing the type of a target object in a distributed object environment computing system, the computing system including a first computer and a second computer and wherein the target object is intended to reside in a computer-controlled process executing on the second computer, the apparatus comprising:

a) a client located on the first computer;
   b) a proxy object intended to reside in a computer-controlled process executing on the first computer;
   c) a calling mechanism for invoking a type checking method using a target interface identifier as an argument to determine whether the target object is of a specified type, the target interface identifier indicative of a possible type of the target object;
   d) an apparent comparison mechanism for determining whether the target interface identifier is equal to or a base for an apparent interface identifier held by the proxy object, the apparent interface identifier indicative of a possible type of the target object, wherein when the target interface identifier is determined to be equal to or a base for the apparent interface identifier, the apparent comparison mechanism is arranged to return an affirmative narrowing indication to the client;

e) a communication device for establishing a connection with an object request broker daemon on the second computer;

f) a target object identifier located on the first computer that identifies the target object to the second computer;

g) an identification mechanism for utilizing the object request broker daemon and the target object identifier to identify a real interface identifier and an interface definition object for the target object; and h) a real comparison mechanism located on the second computer utilizing the interface definition object for comparing the target interface identifier to a real interface identifier and for determining whether the target interface identifier is equal to or a base for the real interface identifier, the real interface identifier indicative of the type of the target object, wherein when the target interface identifier is determined to be equal to or a base for the real interface identifier, an affirmative narrowing indication is returned to the client and wherein when the target interface identifier is determined not to be equal to or a base for the real interface identifier, a negative narrowing indication is returned to the client.

2. An apparatus as recited in claim 1 wherein the client is a client object intended to reside in a computer-controlled process executing on the first computer.

3. An apparatus as recited in claim 1 wherein the first computer and the second computer are the same computer.

4. An apparatus for narrowing the type of a target object in a distributed object environment computing system, the computing system including a first computer and a second computer and wherein the target object is intended to reside in a computer-controlled process executing on the second computer, the apparatus comprising:

a) a client located on the first computer;

b) a proxy object intended to reside in a computer-controlled process executing on the first computer;

c) a calling mechanism for invoking a type checking method using a target interface identifier as an argument to determine whether the target object is of a specified type, the target interface identifier indicative of a possible type of the target object;

d) an apparent comparison mechanism for determining whether the target interface identifier is equal to or a base for an apparent interface identifier held by the proxy object, the apparent interface identifier indicative of a possible type of the target object, wherein when the target interface identifier is determined to be equal to or a base for the apparent interface identifier, the apparent comparison mechanism is arranged to return an affirmative narrowing indication to the client;

e) a real comparison mechanism for comparing the target interface identifier to a real interface identifier and for determining whether the target interface identifier is equal to or a base for the real interface identifier, the real interface identifier indicative of the type of the target object;

f) a cache memory located on the first computer; and g) a cache-checking device utilizing the real comparison mechanism for determining whether the target interface identifier is equal to or a base for the real interface identifier, wherein when said target interface identifier is determined to be equal to or a base for said real interface identifier, said cache-checking device is arranged to return an affirmative narrowing indication to said client.

5. An apparatus as recited in claim 4 wherein the client is a computer-controlled client process executing on the first computer and the cache memory is located in the client process.

6. An apparatus as recited in claim 4 further comprising:

a) a communication device for establishing a connection with an object request broker daemon on the second computer;

b) a daemon comparison mechanism for utilizing the object request broker daemon to determine whether the target interface identifier is equal to or a base for the real interface identifier; and c) a cache-updating device for updating the cache memory based on the object request broker daemon's determination.

7. A method as recited in claim 4 wherein said first computer and said second computer are the same computer.

8. An apparatus for narrowing an input proxy object intended to reside in a computer-controlled process executing on a first computer in a distributed object environment computing system, the apparatus comprising:

a) a client located on a first computer;

b) a target object intended to reside in a computer-controlled process executing on a second computer;

c) a checking mechanism for performing a check cast function on the input proxy object using a target interface identifier, the target interface identifier indicative of a possible type of the target object, the checking mechanism comparing the target interface identifier to an apparent interface identifier of the input proxy object and to interface identifiers of all parent objects of the input proxy object, the apparent interface identifier indicative of a possible type of the target object;

d) a communication device for establishing a connection with an object request broker daemon on the second computer, e) a target object identifier located on the first computer that identifies the target object to the second computer;

f) an identification mechanism for utilizing the object request broker daemon and the target object identifier to identify a real interface identifier and an interface definition object for the target object;

g) a real comparison mechanism utilizing the interface definition object for comparing the target interface identifier to a real interface identifier associated with the target object and for determining whether the target interface identifier is equal to or a base for the real interface identifier, the real interface identifier indicative of the type of the target object; and h) a creating device for creating an output proxy object of the same kind as the input proxy object and of the same type as the target interface identifier.

9. An apparatus as recited in claim 8 further comprising a widening mechanism for widening the output proxy object to a class associated with the target interface identifier.

10. An apparatus as recited in claim 8 wherein the client is a computer-controlled client process executing on the first computer.

11. An apparatus as recited in claim 8 wherein the client is a client object intended to reside in a computer-controlled process executing on the first computer.

12. An apparatus as recited in claim 8 wherein the first computer and the second computer are the same computer.

13. An apparatus as recited in claim 8 wherein the creating device for creating an output proxy object includes a proxy factory table.

14. An apparatus for narrowing an input proxy object intended to reside in a computer-controlled process executing on a first computer in a distributed object environment computing system, the apparatus comprising:
   a) a client located on a first computer;
   b) a target object intended to reside in a computer-controlled process executing on the second computer;
   c) a checking mechanism for performing a check cast function on the input proxy object using a target interface identifier, the target interface identifier indicative of a possible type of the target object;
   d) a real comparison mechanism for determining whether the target interface identifier is equal to or a base for a real interface identifier associated with the target object, the real interface identifier indicative of the type of the target object;
   e) a creating device for creating an output proxy object of the same kind as the input proxy object and of the same type as the target interface identifier;
   f) a cache memory located on the first computer; and
   g) a cache-checking device utilizing the real comparison mechanism for determining whether the target interface identifier is equal to or a base for the real interface identifier, wherein when the target interface identifier is determined to be equal to or a base for the real interface identifier, the creating device is arranged to create an output proxy object of the same kind as the input proxy object and of the same type as the target interface identifier.

15. An apparatus as recited in claim 14 wherein the client is a computer-controlled client process executing on the first computer and the cache memory is located in the client process.

16. An apparatus as recited in claim 14 further comprising:
   a) a communication device for establishing a connection with an object request broker daemon on the second computer;
   b) a daemon comparison mechanism for utilizing the object request broker daemon to determine whether the target interface identifier is equal to or a base for the real interface identifier;
   c) a cache-updating device for updating the cache memory based on the object request broker daemon's determination.

17. A method as recited in claim 14 wherein said first computer and said second computer are the same computer.

18. A computer-implemented method of narrowing the type of a target object in a distributed object environment computing system that includes a client located on a first computer, said target object residing in a computer-controlled process executing on a second computer and a proxy object located on said first computer representing said target object, said method comprising the following under computer control;
   a) said client invoking a type checking method using a target interface identifier as an argument to determine whether said target object is of a specified type, said target interface identifier indicative of a possible type of said target object;
   b) determining whether said target interface identifier is equal to or a base for an apparent interface identifier held by said proxy object located on the first computer, said apparent interface identifier indicative of a possible type of the target object;
   c) wherein when said target interface identifier is determined to be equal to or a base for said apparent interface identifier, an affirmative narrowing indication is returned to said client; and
   d) wherein when said target interface identifier is determined not to be equal to or a base for said apparent interface identifier, said method further comprises,
      establishing a connection with an object request broker daemon on said second computer,
      utilizing said object request broker daemon to identify a real interface identifier and an interface definition object for said target object, said real interface identifier indicative of said type of said target object, wherein said object request broker daemon utilizes a target object identifier passed from said first computer to locate said real interface identifier and said interface definition object, wherein said target object identifier is arranged to identify said target object to said second computer,
      utilizing said interface definition object to compare said target interface identifier to said real interface identifier and to determine whether said target interface identifier is equal to or a base for said real interface identifier, and
      returning the result of the interface definition object determination to said proxy object located on said first computer, wherein when said target interface identifier is determined to be equal to or a base for said real interface identifier, an affirmative narrowing indication is returned to said client and wherein when said target interface identifier is determined not to be equal to or a base for said real interface identifier, a negative narrowing indication is returned to said client.

19. A method as recited in claim 18 wherein the client is a client object intended to reside in a computer-controlled process executing on the first computer.

20. A method as recited in claim 18 wherein the first computer and the second computer are the same computer.

21. A computer-implemented method of narrowing the type of a target object in a distributed object environment computing system that includes a client located on a first computer, said target object residing in a computer-controlled process executing on a second computer and a proxy object located on said first computer representing said target object, said method comprising the following under computer control:
   a) said client invoking a type checking method using a target interface identifier as an argument to determine whether said target object is of a specified type, said target interface identifier indicative of a possible type of said target object;
   b) determining whether said target interface identifier is equal to or a base for an apparent interface identifier held by said proxy object located on the first computer, said apparent interface identifier indicative of a possible type of the target object;
   c) wherein when said target interface identifier is determined to be equal to or a base for said apparent interface identifier, an affirmative narrowing indication is returned to said client; and
   d) wherein when said target interface identifier is determined not to be equal to or a base for said apparent interface identifier, said method further comprises,
      checking a cache memory on said first computer to compare said target interface identifier to a real interface identifier, said real interface identifier indicative of said type of said target object, determining whether said target interface identifier is equal to or a base for said real interface identifier, wherein when said target interface identifier is determined to be equal to or a base for said real interface identifier, an affirmative narrowing indication is returned to said client, and wherein when such determination can not be made by checking said cache memory, making a call to said second computer to determine whether said target interface identifier is equal to or a base for said real interface identifier.

22. A method as recited in claim 21 wherein the client is a computer-controlled client process executing on the first computer and the cache memory is located in the client process.

23. A method as recited in claim 21 wherein when the target interface identifier is determined not to be equal to or a base for the apparent interface identifier the method further comprises the following steps under computer control:

a) establishing a connection with an object request broker daemon on the second computer;

b) utilizing the object request broker daemon to determine whether the target interface identifier is equal to or a base for the real interface identifier;

c) returning the result of the object request broker daemon's determination to the proxy object located on the first computer; and d) updating the cache memory based on the results returned to the proxy object.

24. A method as recited in claim 21 wherein said first computer and said second computer are the same computer.

25. In a distributed object environment computing system that includes a client located on a first computer, an input proxy object residing in a computer-controlled process executing on the first computer, and a target object residing in a computer-controlled process executing on a second computer, a computer-implemented method of narrowing the input proxy object comprising the following under computer control:

a) performing a check cast function on the input proxy object using a target interface identifier, the target interface identifier indicative of a possible type of the target object, the check cast function including the sub-steps of comparing the target interface identifier to an apparent interface identifier of the input proxy object, the apparent interface identifier indicative of a possible type of the target object, and the sub-step of comparing the target interface identifier to interface identifiers of all parent objects of the input proxy object;

b) determining whether the check cast function is successful; and c) wherein if the check cast function is not successful, said method further comprises, establishing a connection with an object request broker daemon on the second computer, utilizing the object request broker daemon to identify a real interface identifier and an interface definition object for the target object, the real interface identifier indicative of the type of the target object, wherein the object request broker daemon utilizes a target object identifier passed from the first computer to locate the real interface identifier and the interface definition object, and wherein the target object identifier is arranged to identify the target object to the second computer, utilizing the interface definition object to compare the target interface identifier to a real interface identifier and to determine whether the target interface identifier is equal to or a base for the real interface identifier, and returning the result of the interface definition object determination to the proxy object located on the first computer, wherein when the target interface identifier is equal to or a base for the real interface identifier, an output proxy object of the same kind as the input proxy object and of the same type as the target interface identifier is created.

26. A method as recited in claim 25 further comprising the step under computer control of widening the output proxy object to a class associated with the target interface identifier.

27. A method as recited in claim 25 wherein the client is a computer-controlled client process executing on the first computer.

28. A method as recited in claim 25 wherein the client is a client object intended to reside in a computer-controlled process executing on the first computer.

29. A method as recited in claim 25 wherein the first computer and the second computer are the same computer.

30. A method as recited in claim 25 wherein the step of creating an output proxy object is performed by using a proxy factory table in order to find a proxy factory based on the kind of the input proxy object and the type of the target interface identifier.

31. In a distributed object environment computing system that includes a client located on a first computer, an input proxy object residing in a computer-controlled process executing on the first computer, and a target object residing in a computer-controlled process executing on a second computer, a computer-implemented method of narrowing the input proxy object comprising the following under computer control:

a) performing a check cast function on the input proxy object using a target interface identifier, the target interface identifier indicative of a possible type of the target object, the check cast function including the sub-steps of comparing the target interface identifier to an apparent interface identifier of the input proxy object, the apparent interface identifier indicative of a possible type of the target object, and the sub-step of comparing the target interface identifier to interface identifiers of all parent objects of the input proxy object;

b) determining whether the check cast function is successful; and c) wherein if the check cast function is not successful, said method further comprises, checking a cache memory on said first computer to compare said target interface identifier to a real interface identifier, said real interface identifier indicative of said type of said target object, determining whether said target interface identifier is equal to or a base for said real interface identifier, wherein when said target interface identifier is determined to be equal to or a base for said real interface identifier, an output proxy object of the same kind as the input proxy object and of the same type as the target interface identifier is created, and wherein when such determination can not be made by checking said cache memory, making a call to said second computer to determine whether said target interface identifier is equal to or a base for said real interface identifier.

32. A method as recited in claim 31 wherein said first computer and said second computer are the same computer.

33. A method as recited in claim 31 wherein the client is a computer-controlled client process executing on the first computer and the cache memory is located in the client process.

34. A method as recited in claim 31 wherein when the check cast function is not successful the method further comprises the following steps under computer control:

a) establishing a connection with an object request broker daemon on the second computer;

b) utilizing the object request broker daemon to determine whether the target interface identifier is equal to or a base for the real interface identifier;

c) returning the result of the object request broker daemon's determination to the proxy object located on the first computer; and d) updating the cache memory based on the results returned to the proxy object.

* * * * *